May 4, 1948.	J. JANDASEK	2,440,825
ROTARY HYDRAULIC TORQUE CONVERTER
Filed June 30, 1943	3 Sheets-Sheet 1
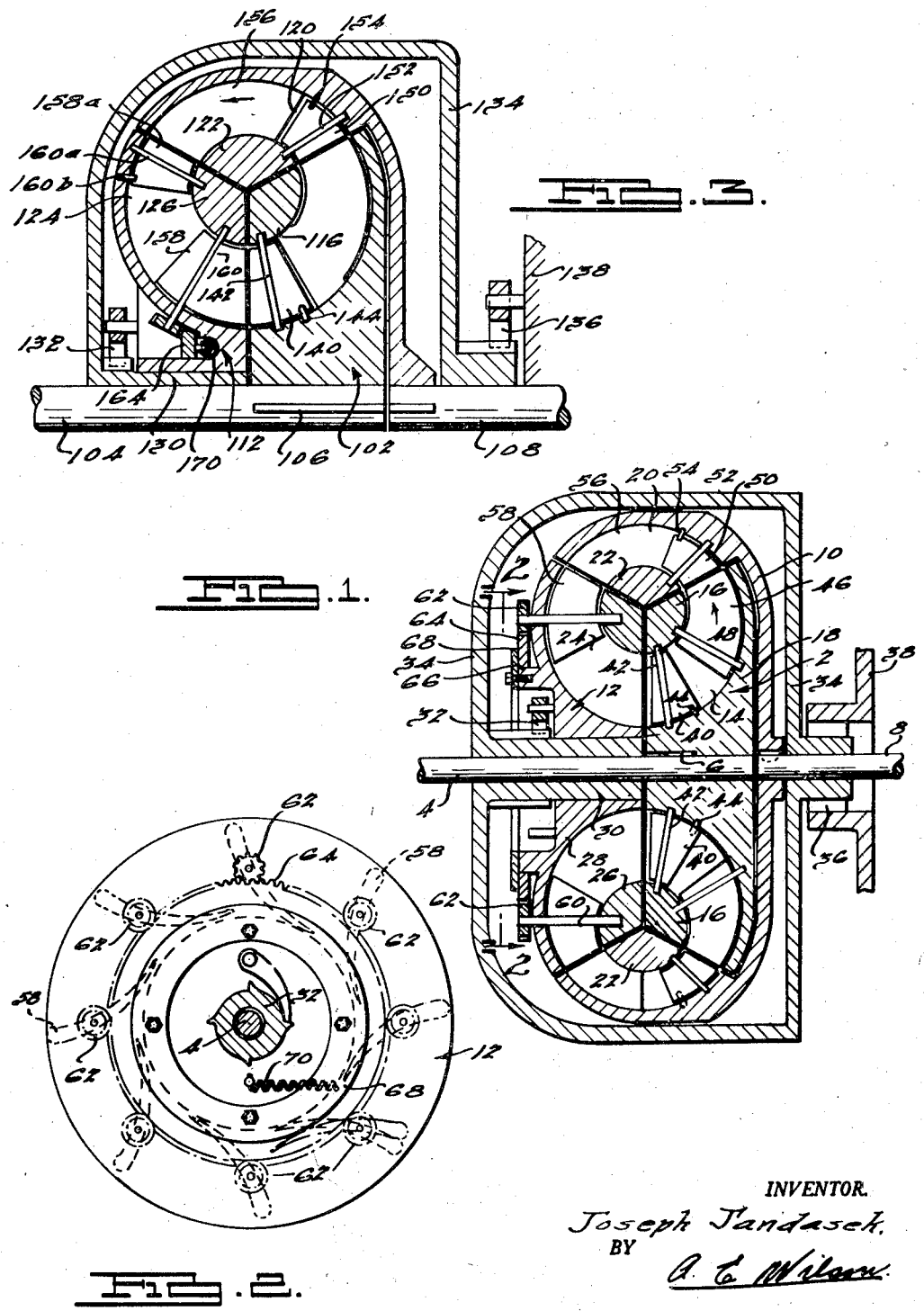

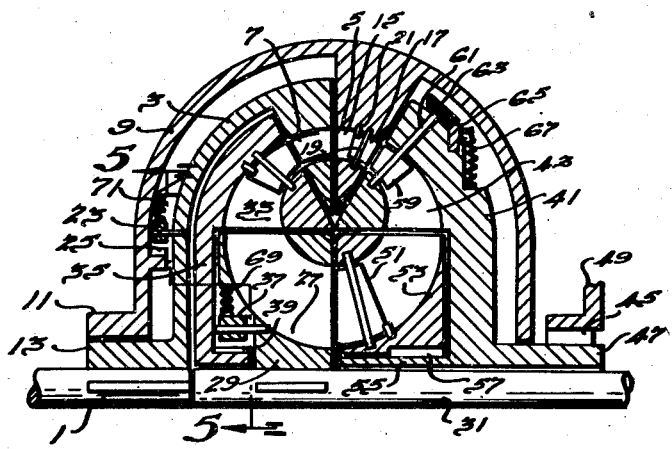

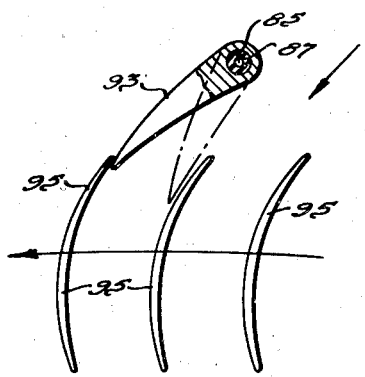
Fig. 12.
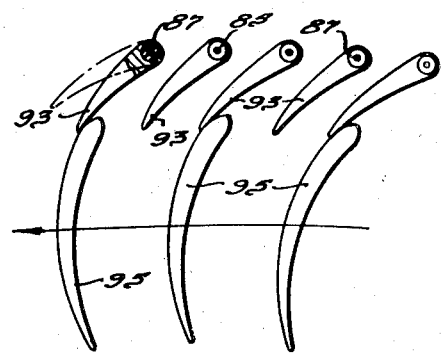
Fig. 13.
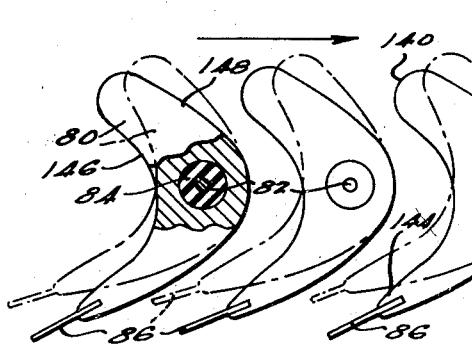
Fig. 14.
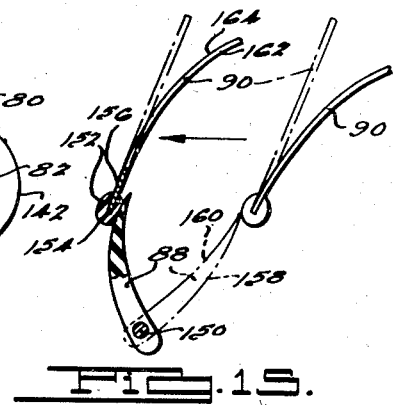
Fig. 15.
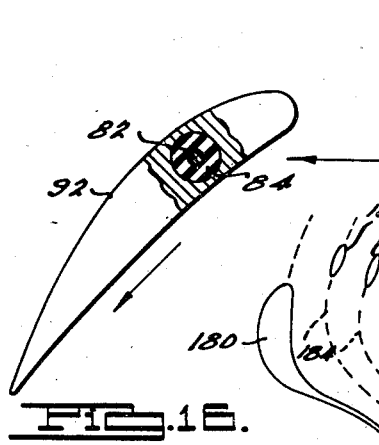
Fig. 16.
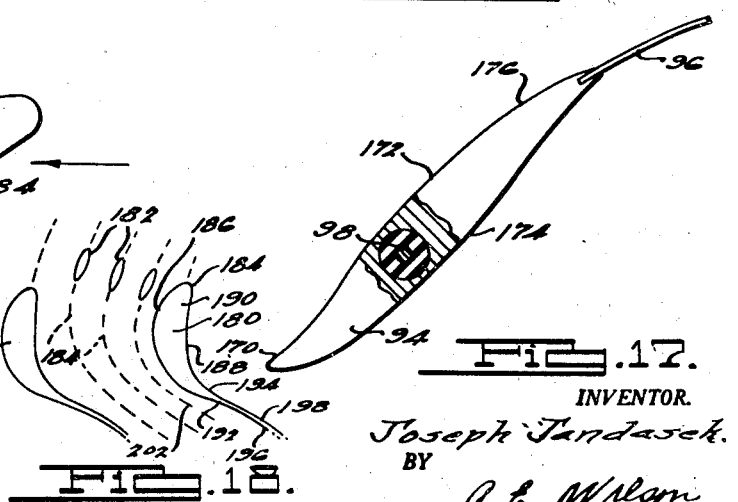
Fig. 17.
Fig. 18.
INVENTOR.
Joseph Jandasek.
BY Patented May 4, 1948

2,440,825

UNITED STATES PATENT OFFICE 2,440,825

ROTARY HYDRAULIC TORQUE CONVERTER

Joseph Jandasek, Highland Park, Mich., assignor to Bendix Aviation Corporation, South Bend, Ind., a corporation of Delaware Application June 30, 1943, Serial No. 492,809

4 Claims. (Cl. 60—54)

This invention relates to transmissions and more particularly to fluid transmissions having flexibly mounted vanes, contoured to increase the over-all efficiency of the transmission.

Heretofore in the fluid transmission art it has been customary to employ fixed vanes or vanes mounted on shafts in such a manner that a force could be exerted on the vanes to rotate them to vary the angle at which the vanes contact or are contacted by the power transmitting fluid in the circuit to vary the power transmitting characteristics of the transmission.

An object of this invention is therefore to provide a fluid transmission having resiliently mounted fluid deflecting vanes capable of assuming varying angular relations in accordance with variations of fluid reaction exerted on the vanes.

Another object resides in the provision of a fluid transmission having fluid deflecting vanes provided with resilient mountings and having contoured portions effective to deflect the fluid as it circulates through the power transmitting fluid circuit to increase the over-all efficiency of the transmission.

A further object is to provide a fluid transmission having flexible vanes adapted to assume varying contours under the influence of fluid reaction and centrifugal force exerted thereon to circulate the fluid through the power transmitting fluid circuit in a more efficient manner.

Yet a further object resides in the provision of fluid deflecting vanes having spaced fluid energizing and equalizing portions whereby the overall efficiency of transmitting power in a fluid transmission may be increased.

Another object of the invention is to provide a semi-free vane having a resilient mounting whereby the vane may assume varying angular relations in accordance with variations of fluid reaction exerted thereon.

Another object of the invention resides in the provision of a fluid foil supported on a resilient mounting.

A further object of the invention is to provide an improved self-aligning entrance blade for an impeller, a turbine or a guide wheel of a fluid transmission operative to minimize frictional losses and shock in the operation of the transmission.

Another object of the invention is to provide a fluid transmission having independently operable entrance and discharge impeller, turbine and guide wheel units.

Yet a still further object is to provide a transmission wherein discharge impeller and turbine units are directly connected to driving and driven shafts, and entrance impeller and turbine units are operably connected to the driving and driven shafts respectively through one-way clutches which render the entrance units operable automatically dependent on variations of speed of the driving and driven shafts.

Another object is to provide a fluid transmission including impeller and turbine units, and a guide wheel having independently operable entrance and discharge portions, means providing for free rotation of both portions with the impeller and turbine units when the transmission is operating as a fluid coupling and means for holding at least one of the portions stationary when the transmission is operating as a torque converter.

A further object of the invention resides in the provision of improved vanes and blades for impeller, turbine and guide wheel units.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a longitudinal sectional view of a fluid transmission embodying the invention;

Fig. 2 is a sectional view taken substantially on the line 2—2 of Fig. 1;

Fig. 3 is a part sectional view of an embodiment of the invention similar in many respects to the embodiment illustrated in Figs. 1 and 2;

Fig. 4 is a part sectional view illustrating a modified form of the invention;

Fig. 5 is a sectional view taken substantially on the line 5—5 of Fig. 4;

Fig. 6 is a diagrammatic view illustrating improved impeller blades in two operative positions;

Figs. 7 and 8 are end and side elevation views of vane flexing means disclosed in Fig. 6;

Fig. 9 is a part sectional view of a modified form of impeller blade;

Figs. 10 and 11 are views similar to Fig. 9 showing the blade in varying operative positions;

Figs. 12 and 13 are diagrammatic views showing still further modified forms of semi-free vanes;

Fig. 14 is a part sectional view showing main vanes in two operative positions;

Fig. 15 illustrates an improved impeller entrance blade in two operative positions;

Fig. 16 is a part sectional view of a turbine semi-free vane, and

Fig. 17 is a part sectional view of an improved impeller main vane;

Fig. 18 is a diagrammatic view showing a further modified form of vane.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to Figs. 1 and 2, it will be observed that an impeller 2 is fixed to a driving shaft 4 in any suitable manner as by means of a key 6. The driving shaft 4 may be driven by any suitable source of power such for example as the engine of a motor vehicle.

A driven shaft 8 having a turbine web 10 fixed thereto receives energy from fluid circulated by the impeller 2 and transmit the energy to the driven shaft 8. A guide wheel 12 is interposed between the turbine and impeller units to increase the turning moment of the fluid circulating through the impeller and turbine units.

The impeller, turbine and guide wheel provide a circuit in which fluid circulates to transmit power. The impeller 2 has a channel 14 between an impeller shroud 16 and an impeller web 18. The turbine has a channel 20 between a turbine shroud 22 and the turbine web 10 and the guide wheel has a channel 24 between a guide wheel shroud 26 and a guide wheel web 28.

The guide wheel web 28 is mounted for rotation on a sleeve 30 supported for rotation on the driving shaft 4, and a one-way drive mechanism 32 of any suitable type is interposed between the web 28 and the sleeve 30 to lock the guide wheel against rotation in clockwise direction as viewed in Fig. 2 when the transmission is operating as a torque converter and to permit the guide wheel to rotate in the counter-clockwise direction as viewed in Fig. 2 when the transmission is operating as a fluid coupling.

A case 34 on the sleeve 30 rotatable on the driving shaft 4 encloses the impeller, turbine and guide wheel, and the driven shaft 8 projects from the case 34 as illustrated. It will of course be understood that the case 34 may be made in two or more parts to facilitate assembly. Any suitable one-way brake mechanism 36 may be interposed between the case 34 and a stationary portion 38 of the vehicle or other mounting of the device. When the transmission is operating as a fluid coupling, the one-way brake mechanism 36 operates to release the housing 34 to permit it to rotate with the turbine and impeller units so as to minimize friction.

A plurality of spaced semi-free vanes 40 are mounted on spaced shafts 42 in the entrance portion of the impeller channel 14 to vary the angular flow of the fluid as it enters the impeller. The vanes 40 are free to move angularly between limits defined by spaced stop members 44 arranged on opposite sides of the vanes and a plurality of flexible main blades 46 are preferably mounted on shafts 48 in the impeller channel 14 posterior to the semi-free vanes 40.

A plurality of spaced semi-free entrance vanes 50 mounted on shafts 52 journaled in the turbine shroud 22 and the turbine web 10 are in the entrance of the turbine channel 20. The vanes 50 are free to move angularly between limits defined by spaced stop members 54 arranged on opposite sides of the vanes, and a plurality of spaced main turbine vanes 56 are arranged in the turbine channel 20 posterior to the semi-free vanes 50.

A plurality of spaced main gates 58 fixed to spaced shafts 60 journaled in the guide wheel shroud 26 and the guide wheel web 28 and extended through and beyond the web, are provided to vary the angular flow of the fluid in the guide wheel. Means are provided to vary the angular relation of the main gates 58 within the channel 24.

One desirable control means for the gates comprises a plurality of pinions 62 one secured to each of the shafts 60 and meshing with a ring gear 64 rotatably mounted on a flange 66 carried by the guide wheel web member 28. A retainer 68 may be bolted to the flange 66 to secure the ring gear 64 against displacement. Yielding means such for example as a spring 70 is interposed between the ring gear 64 and the guide wheel web 28 to exert a yielding force on the ring gear 64 tending to urge the gates 58 toward one extreme angular position.

Fig. 3 shows an embodiment of the invention which is similar in many respects to that illustrated in Figs. 1 and 2. Corresponding parts have therefore been given corresponding reference numerals with the addition of 100. It will be observed that the guide wheel is provided with semi-free entrance gates 158a mounted on spaced rotatable shafts 160a. The gates 158a are movable angularly between the limits defined by spaced stop members 160b on opposite sides of the gates.

Attention is called to the fact that this construction is disclosed but not claimed in my application Serial No. 475,278, now Patent No. 2,186,025, granted January 9, 1940, reference being had to Figs. 7, 8 and 14.

The construction disclosed in Figs. 4 and 5 originated for the most part in my application Serial No. 547,256, filed June 27, 1931, now Patent No. 2,271,919, dated February 3, 1942, as Figs. 26 and 27. It will be observed that a driving shaft 1 is provided to constantly drive a discharge impeller web 3 having an impeller channel 5 in which an impeller main blade 7 is positioned. A case 9 is provided with a sleeve 11 which rides on a sleeve 13 of the impeller web 3 and supports an entrance impeller channel 15 having therein a plurality of spaced semi-free vanes 17 mounted on rotatable shafts 19. Spaced stops 21 are provided to limit the angular movement of the semi-free vanes 17.

Any suitable one-way driving means as illustrated diagrammatically by the pawl and ratchet mechanism 23 and 25 may be provided to drive the case 9 having therein the entrance impeller channel 15, with the web 3 having therein the discharge impeller channel 5. The one-way driving means may be controlled centrifugally to rotate the casing 9 with the web 3 when a substantially predetermined speed of rotation of the impeller is attained, suitable yielding means such as a spring 71 (Fig. 5) being provided to maintain the one-way driving means inoperative until a substantially predetermined speed of rotation is attained.

A discharge turbine channel 27 is supported by a web 29 fixed to a driven shaft 31, and an entrance turbine channel 33 is provided by a web 35 operably connected to the web 29 by any suitable one-way driving means as illustrated diagrammatically by the centrifugally actuated ratchet and pawl mechanism 37 and 39 respectively opposed by suitable yielding means such for example as a spring 60, illustrated in Fig. 5.

A web 41 mounted on the driven shaft 31 has a discharge guide wheel channel 43 preferably adjacent the inlet impeller channel 15. Any suitable one-way brake such for example as the one-way brake illustrated at 45 interposed between a sleeve 47 on the web 41 and a stationary portion 49 of the vehicle may be provided to hold the web 41 and the discharge guide wheel channel 43 when the transmission is operating as a torque converter and to release it when the transmission is operating as a fluid coupling.

An entrance guide wheel channel 51 provided by a web 53 is supported for rotation on a sleeve 55 integral with the web 41. Any suitable one-way driving means such for example as that illustrated at 57 may be interposed between the web 53 and the sleeve 55 to lock the entrance and discharge guide wheels together when the transmission is operating as a torque converter and to release the guide wheels when the transmission is operating as a fluid coupling.

A plurality of spaced main gates 59 interposed in the discharge guide wheel channel 43 may be provided to vary the angularity of the fluid flowing through the channel. The gates 59 may be mounted on rotatable shafts 61 having pinions 63 in mesh with a ring gear 64 to vary the angular relation of the main gates 59, yielding means such as a spring 67 being interposed between the ring gear 65 and the web 43 to yieldingly urge the gates toward one extreme angular position.

Figs. 6, 7 and 8 illustrate a modification of an impeller blade which may be used in connection with the impellers disclosed in Figs. 1, 3 and 4. It will be observed that impeller blades 73 are fixed to shafts 75. The ends of the shafts 75 are each provided with a slot 77 as illustrated in Figs. 7 and 8 to receive a flexible band 79 which yieldingly urges the vanes 75 toward the dotted line position 81 illustrated in Fig. 6. When the vanes 73 are in the dotted line position 81 the energy imparted to the fluid circulating in the unit is minimized whereupon practically no power is transmitted to the turbine and creep of the driven shaft is eliminated. As the speed of rotation of the impeller in the direction of the arrow 99 increases, the centrifugal force on the unbalanced vanes 73 increases thereby tending to urge the vanes toward the full line radial position illustrated in Fig. 6 thereby flexing the band 79 which constantly exerts a yielding force urging the vanes towards the dotted line position 81.

The inlet portions 100 of the vanes 73 are provided with scooping portions 102 defined by diverging angular walls 104. The surfaces 104 terminate in a body portion 106 of any desired fluid deflecting form and the trailing edges of the vanes terminate in portions 108 and the trailing edge 110 defined by angularly related surfaces 112.

The leading ends of the vanes 73 provide more efficient scooping or picking up of the fluid by the impeller. Maximum energy is imparted to the circulating fluid by the body portion 106 and after the portion 108 of the vane is passed the portion 112 relieves the fluid pressure and equalizes fluid velocities on opposite sides of the blade whereupon less turbulence in the fluid flow is encountered and greater efficiency of operation results.

Figs. 9, 10 and 11 illustrate another desirable modification of impeller blade shown in the positions assumed at high, medium and idling speeds. It will be observed that this blade has a main body section 83 mounted on stationary shafts 85 by means of a layer of resilient material 87 such for example as rubber fixed to the shafts 85 and the body section 83 in any suitable manner as by vulcanizing. The body section 83 of the blade is preferably of a relatively light material such for example as an alloy of aluminum and is provided with a trailing portion 89 formed of heavy metal such for example as iron or steel to increase the centrifugal force acting on the blade to more accurately control the position of the blades under varying speeds of operation.

Suitable fixed entrance blades 91 may be provided to limit the angular movement of the main blades in one direction when operating at high speed and to guide the fluid into the impeller. It will be observed that in the medium speed position illustrated in Fig. 10, the fluid may pass on both sides of the body section 83 whereupon the force required to drive the fluid is decreased. The resilient material 87 interposed between the body section 83 and the shafts 85 tends to yieldingly urge the vanes toward the idling position illustrated in Fig. 11.

The fixed entrance blades 91 are provided with angularly disposed surfaces 120 to pick up the power transmitting fluid and transmit it to the main body portion 122 in the manner discussed in connection with the blade illustrated in Figs. 6 to 8. The outer edge of the fixed entrance blades 91 is angularly disposed as illustrated at 124 to coincide with leading edge 126 of the main body 83 when the vane 83 is in the high speed position as illustrated in Fig. 9.

The trailing edge of the blade 83 is defined by contoured surfaces providing a suitable outlet 128. A curved portion 130 interposed between the portion 128 and the main body 132 of the blade 83 is most effective in imparting energy to the circulating fluid as the impeller rotates.

At idling speed as illustrated in Fig. 11 the curved portion of the fixed entrance blades 91 readily scoops up the power transmitting fluid and transmits it to the contoured surfaces 122. The main blade 83 at idling speed occupies the substantially circumferential position illustrated in Fig. 11 under the influence of the force exerted by the resilient material 87 interposed between the shafts 85 and the blades 83. The fluid picked up by the entrance blades 91 flows over the angularly disposed surface 124 and flows between the fixed entrance blades 91 and the body sections 132 of the main blades 83.

As the speed of rotation of the impeller increases, the trailing portion 89 being heavier than the leading portion 134 moves the blade 83 angularly on the shaft 85 thereby flexing the resilient material 87 to position the blades as illustrated in Fig. 10. During this phase of the operation, a portion of the fluid flows between the fixed entrance blades 91 and the main blades 83. Energy is imparted to the fluid by the fixed entrance blades 91 and the body portion 132 of the main blades 83.

As the speed of rotation is further increased with the corresponding increase in centrifugal force exerted on the trailing portions 89, the vanes 83 are rotated on the shafts 85 to assume the position illustrated in Fig. 9 whereupon the space between the entrance blades 91 and the leading edge 126 of the main blades 83 is closed to interrupt the flow of fluid therebetween. Under these conditions of operation, fluid flows along the surface of the fixed entrance blades and over the surface of the main blades, energy being imparted to the fluid as it is forced over the vanes by rotation of the impeller. The maximum energy is imparted to the fluid at the curved portion 130 and after passing this point the velocity of the fluid is decelerated by the contoured surfaces 128 of the blade.

During idling speed operations as illustrated in Fig. 11, a space 136 is available between the fixed entrance blades 91 and the main blades 83 to equalize pressures on opposite sides of the blades.

Fig. 12 illustrates a modification of main vane 95 and semi-free vane 93 which may be employed in connection with an impeller, turbine or guide wheel unit. The resilient material 87 may be similar to that illustrated in connection with the embodiment of Figs. 9 and 11 and preferably operates to yieldingly urge the vane 93 to a position intermediate the full and dotted line positions wherein the trailing edge of the vane 93 lies approximately midway between the main vanes 95. It will be observed that as the vanes 93 are urged from the normal position by the fluid reaction they engage the blades 95 which act as stop members to limit their angular movement.

Fig. 13 shows an embodiment which is similar to that of Fig. 12 with the exception that the alternate semi-free vanes 93 are free to move over a greater angle, the resiliency of the material 87 being relied upon to limit their extreme angular movements. Attention is called to the fact that as these vanes move angularly on the shafts 85, the parts do not wear because of the fact that there is no sliding movement since the material 87 merely yields to permit the vanes to change their angular position.

Fig. 14 illustrates main turbine vanes 80 resiliently mounted on shafts as by rubber bushings 84. It will be observed that the main turbine vanes 80 are provided with flexible portions 86 at the trailing edges of the vanes which may be formed of any suitable yielding material and may be cast into the body portion of the vanes 80. As the vanes 80 move angularly from the full line position toward the dotted line position, it will be observed that the entrance angle is increased and that the discharge angle is decreased whereupon a greater proportion of energy will be absorbed by the turbine wheel. The turbine wheels are thereby changed from antireaction vanes in the position shown in full lines to reaction vanes as illustrated in the dotted line positions.

It will be noted that the vanes 80 have well rounded entrance portions 140 and are of the high curvature type in order to absorb in the turbine the maximum torque from the power transmitting fluid. The blades are relatively thick adjacent their midportions 142 and taper to provide curved portions 144 to relieve the fluid velocity and equalize pressure adjacent the outlet from the turbine.

The trailing portions 86 of the vanes 80 being flexible are free to deflect the fluid to equalize the fluid pressures and velocities in the power transmitting fluid circuit. These vanes, being mounted on rubber bushings 84 are self-adjustable and are free to seek the most efficient operating position under the influence of forces exerted on their surfaces by the fluid flowing over their lower and upper surfaces 146 and 148 respectively.

Fig. 15 illustrates a still further modified form of a semi-free vane 88 suitable for use on an impeller. It will be observed that during a heavy load operation a main blade 90 and the semi-free vane 88 are in the position illustrated in full lines. As the speed increases at light load the semi-free vane 88 is moved by fluid reaction to the dotted line position, and the blade 90 is moved by fluid reaction and centrifugal force to the dotted line position illustrated.

The semi-free vanes 88 being formed of resilient material and mounted on shafts 150 assume the dotted line position under no load condition. The main blades 90 are formed of resilient material and are mounted in a support 152 contoured to form a streamlined entrance edge portion 154 with respect to the body portion 156 to guide the fluid flow in such a manner as to minimize turbulence as the power transmitting fluid passes over the blades.

As the speed of rotation decreases and the load increases, fluid reaction exerted on the angularly disposed surfaces 158 and 160 of the semi-free vanes 88 induces them to move toward the full line position, and fluid reaction exerted on the opposite sides 162 and 164 of the main blade 90 causes them to assume the full line positions illustrated whereupon maximum energy is imparted to the circulating fluid.

It will be understood that the resilient mounting 152 is free to flex under the influence of centrifugal force and fluid reaction exerted on the surfaces 162 and 164 of the main blades 90 whereby these blades act in a manner generally similar to the resilient mountings for the blades illustrated in Fig. 14.

Fig. 16 illustrates a turbine vane 92 of a desirable fluid foil type mounted on a shaft 82 and having the flexible material 84 interposed therebetween.

Fig. 17 shows an impeller blade 94 having a flexible trailing edge 96 cast in the body section 94 and mounted on a shaft 98 with suitable resilient material interposed between the shaft and the body portion of the vane to permit varying the angular relation of the vane in accordance with the varying fluid forces exerted on the vane.

The impeller blade 94 has an under-bent portion 170 adjacent its leading edge to receive the power transmitting fluid in a more efficient manner and transmit it over the surfaces 172 and 174 of the blade 94, to a curved portion 176 wherein the maximum velocity is imparted to the energized fluid. The flexible trailing edge 96 of the blade 94 deflects under the influence of fluid reaction and centrifugal force to relieve the flow angles at the outlet from the blade 94 to equalize pressures and prevent turbulence.

Fig. 18 illustrates spaced turbine or guide wheel blades 180 having a plurality of rectifying vanes 182 interposed between each of the main vanes. The main vanes have leading edge portions 184 converging with streamline surfaces 186 and 188 of the main body portion 190.

The trailing edges of the blades 180 are contoured to provide sections 192 and 194 to absorb from or impart maximum energy to the circulating fluid. The trailing edges of the blades beyond the portions 192 and 194 are curved as illustrated at 196 and 198 to equalize fluid velocities and pressures.

The rectifying vanes 182 interposed between each pair of main vanes 180 cooperate with the contours of the main blades 180 to redirect the fluid to induce the fluid to follow the contour of the blades as illustrated by the streamlines 200. As illustrated by the dotted lines 202, the fluid does not follow the contour of the vanes at the portions 192 and 194 of the blade 180 and it is therefore desirable to employ the portions 196 and 198 to equalize fluid velocity and pressure to prevent turbulence. It thus appears that the trailing edge portion will minimize or eliminate turbulence in the power transmitting fluid imparted thereto by the fluid deflecting portions of the blade.

Attention is called to the fact that in any of the embodiments of the invention disclosed in Figs. 1 to 5, the guide wheel structure may be omitted and the impeller provided with vanes of the type illustrated in Figs. 6 to 8, 9 to 11, 15 or 17 to provide a fluid coupling wherein the impeller will be substantially unloaded at idling speeds to prevent creep. It is also to be understood that various features disclosed in the different figures of this application may be combined with corresponding features of other figures without departing from the spirit of the invention.

This application is a continuation-in-part of my co-pending application Serial No. 310,786, filed December 23, 1939, now abandoned, and a continuation in part of my co-pending application Serial No. 317,637, filed February 7, 1940, now Pat. No. 2,388,849.

I claim:

1. In a fluid transmission, a blade, a pintle extending through the width of the blade and enclosed thereby, connecting means between the pintle and blade including flexible material bonded to the pintle and blade whereby the blade may move appreciably relative to the shaft.

2. In a transmission having a channel for the circulation of fluid, a pintle extending across said channel, a vane totally enclosing the portion of the pintle within the fluid channel, and connecting means between the pintle and vane including rubber vulcanized to the pintle and vane to permit appreciable movement of the blade under the influence of the force exerted by the fluid circulating in the channel.

3. In a fluid transmission, a pintle across a fluid channel, a resilient sleeve fitted on and bonded to the pintle so as to totally enclose the portion of the pintle in the channel, and a blade fitted on and bonded directly to the sleeve so as to totally enclose the sleeve.

4. In a fluid transmission, a pintle, a rubber sleeve enclosing the pintle and vulcanized on the pintle, and a blade enclosing the sleeve and vulcanized on the sleeve.

JOSEPH JANDASEK.

REFERENCES CITED

The following references are of record in the file of this patent:

UNITED STATES PATENTS

| Number | Name | Date |
|---|---|---|
| 110,915 | Hawkins | Jan. 10, 1871 |
| 1,825,768 | Barbarou | Oct. 6, 1931 |
| 1,942,721 | Moffitt | Jan. 9, 1934 |
| 2,168,862 | De Lavaud | Aug. 8, 1939 |
| 2,169,849 | Pitcairn | Aug. 15, 1939 |
| 2,186,025 | Jandasek | Jan. 9, 1940 |
| 2,200,596 | Dodge | May 14, 1940 |
| 2,235,370 | Jandasek | Mar. 18, 1941 |
| 2,235,605 | Bugatti | Mar. 18, 1941 |
| 2,245,251 | Chilton | June 10, 1941 |
| 2,271,919 | Jandasek | Feb. 3, 1942 |
| 2,293,766 | Salerni | Aug. 25, 1942 |

FOREIGN PATENTS

| Number | Country | Date |
|---|---|---|
| 332,927 | Germany | Feb. 14, 1921 |
| 617,173 | Germany | Aug. 13, 1935 |

OTHER REFERENCES

A. P. C. Publication D'Aubarede, Ser. No. 425,692, published June 1, 1943.